July 26, 1960   V. C. STERRETT ET AL   2,946,343
VALVE CONSTRUCTION
Filed May 29, 1957
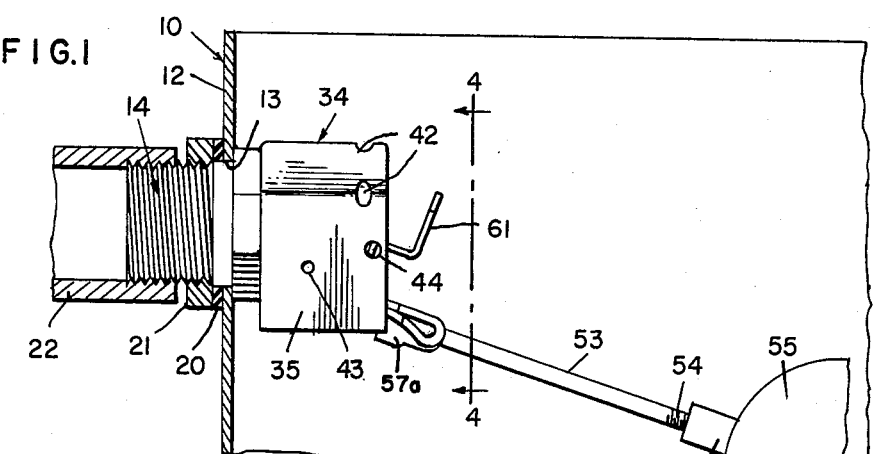
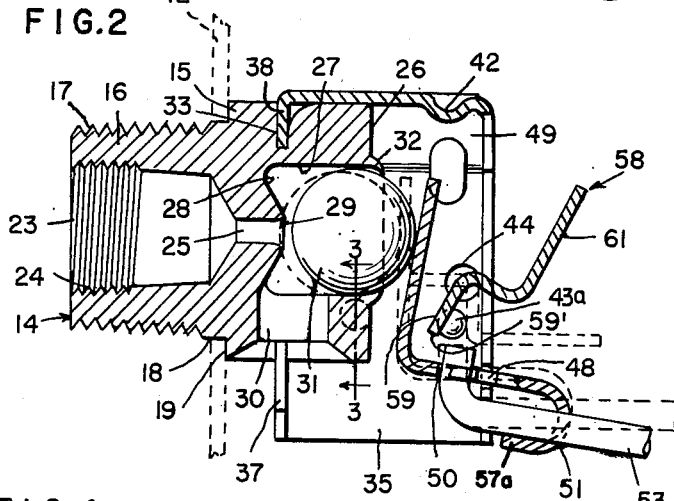
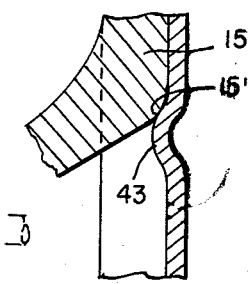
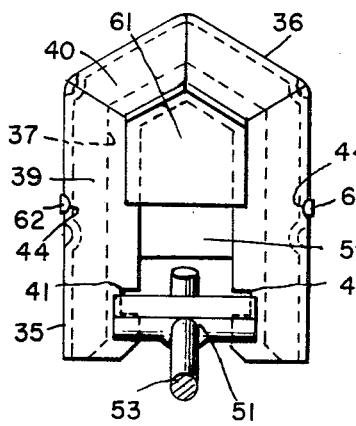
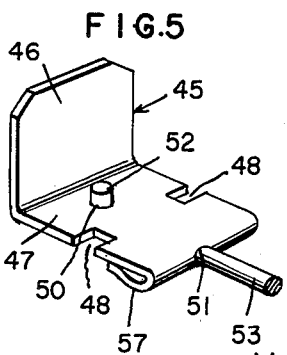
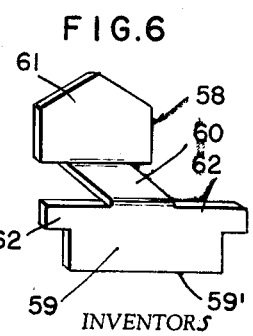
INVENTORS
Vance C. Sterrett
BY William H. Peters
Shoemaker & Mattare
ATTYS.

United States Patent Office 2,946,343
Patented July 26, 1960

2,946,343

VALVE CONSTRUCTION

Vance C. Sterrett, 501 W. Linden Ave., Logansport, Ind., and William H. Peters, 218 N. East St., Montpelier, Ohio Filed May 29, 1957, Ser. No. 662,477

7 Claims. (Cl. 137—390)

This invention relates generally to the class of valves and more particularly to an improved float controlled valve.

The present invention is directed to a float controlled valve which is designed primarily for use in receptacles where liquid is intermittently withdrawn and functions to restore the liquid level by means of a float which upon dropping to a predetermined position, will open the valve for the introduction of liquid into the receptacle until the level rises to a predetermined extent whereupon the valve is closed by the elevated float. Valves of this kind are commonly used in flush tanks, animal watering troughs and similar structures and while it is particularly adapted for use in such structures, it is to be understood that it is not at all to be limited to such use.

In connection with valves of the kind above described, it is sometimes desirable that the valve be secured or locked in closed position and accordingly it is a particular object of the present invention to provide a float controlled valve structure wherein a novel means is provided for securing the movable element of the valve in a position where the valve will be maintained closed or shut off.

Another object of the invention is to provide a valve structure wherein a freely movable valve element is confined in a socketed body and has associated with it a pivoted thrust element connected with a float member whereby when the valve is set up for use the float member in rising and falling with changes in the liquid level of a receptacle will apply thrust on the rising of the float to close the valve and will remove or shift the thrust element from the valve upon the descent of the float to permit the valve to open for the admission of liquid to the receptacle.

A further object of the invention is to provide in a structure of the above described character, a shiftable locking element which is supported adjacent to the thrust element and which may be easily and quickly moved to a position where it will engage the thrust element and hold the latter in valve closing position when such action is required or found desirable.

A further and more specific object of the invention is to provide a float controlled valve structure embodying a chambered body housing a movable valve element and having a fluid admission port leading thereinto and an outlet port leading therefrom, with a hood structure supported on the body and overlying the chambered portion thereof and carrying a pivotally mounted thrust element having a portion positioned to force the valve element to closing position over the inlet port when pivoted or rocked in one direction, with means for attaching a float to the thrust element for operating the valve in the manner stated.

A further object is to provide a structure according to the description of the preceding paragraph wherein the thrust element supporting hood also supports a locking member which is shiftable to force the thrust element to a valve closed position.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view illustrating the improved valve structure of the present invention in side elevation and showing the same mounted in a wall of a receptacle, the wall being in section and also showing a liquid supply pipe in section and connected with the outer end of the valve body;

Fig. 2 is a vertical longitudinal section on an enlarged scale through the valve structure showing the movable element in open position and showing the thrust element and the locking means in the position which they assume when the valve is open and further showing in dotted outline the closed position for the valve and the thrust element and the locking position for the valve locking element;

Fig. 3 is a fragmentary section on an enlarged scale, taken substantially on the line 3—3 of Fig. 2;

Fig. 4 is a sectional view taken substantially on the line 4—4 of Fig. 1;

Fig. 5 is a view in perspective of the thrust element showing a portion of the float rod attached thereto;

Fig. 6 is a view in perspective of the locking element.

Referring now more particularly to the drawing, the numeral 10 generally designates a portion of a receptacle in one wall of which the present valve structure is shown mounted, which wall is designated 12 and has an opening 13 therein.

The valve structure comprises an elongate body which is generally designated 14 and which is formed through a portion of its length from one end as a hexagonal head 15, while the remainder of its length or outer end portion is of reduced size and circular cross section to form the coupling end 16 which is externally screw threaded as indicated at 17. Between the outer end 16 and the hexagonal head 15 is formed the unthreaded circular portion 18 which joins the outwardly facing shoulder 19. This portion 18, when the valve is set up for use, as for example, in the tank 10, fits in the opening 13 and the shoulder 19 of the head positions against the inner surface of the wall 12 while against the outer side of the wall may be positioned a washer 20 which is compressed by the securing nut 21 threaded on the outer end portion 16, as illustrated. This outer end portion may also have coupled therewith in the manner shown a liquid feed pipe 22 or the feed pipe may be of smaller diameter and threaded into the outer end portion 16, as will hereinafter become apparent.

The outer end portion of the body has the axially directed passage 23 formed therein which may be internally screw threaded as indicated at 24 to receive an externally threaded end of a feed pipe and the inner end of this passage 23 which constitutes an entrance passage is reduced and joins a short axial middle passage 25.

The inner end face 26 of the body or of the hexagonal head portion 15 has opening therethrough a valve socket or chamber 27. The inner end or bottom 28 of this chamber is of frusto-conical form and the inner end of the short passage 25 opens through the center of this frusto-conical bottom thereby forming the annular seat 29 around the inner end of the passage 25.

Communicating with the socket or chamber 27 is a liquid outlet port 30 which opens through the side of the hexagonal head 15 and which, obviously, lies inside of the receptacle 10 when the valve is mounted in the manner shown.

Confined in the socket 27 for limited axial movement therein is a valve element in the form of a ball 31 which preferably is fashioned of hard rubber or plastic and which is adapted when moved inwardly in the socket to fit on the seat 29 to close the passage 25. Outward movement of the valve element 31 is limited by the flange 32 which is turned in across the edge of the socket after the valve element is placed therein, to limit the outward movement of the element or prevent its escape, as will be obvious.

The hexagonal head has cut therein and therearound the encircling slot 33 which cuts across the liquid outlet or discharge port 30 as illustrated. While the slot 33 is shown as being slightly to the rear of the transverse center of the hexagonal head, it may be located slightly forwardly or rearwardly of this position. This slot functions to removably hold in position the hood structure and parts associated therewith, which are about to be described.

The numeral 34 generally designates a housing or hood which encloses the major portion of the hexagonal head. This hood may be formed by bending or folding a strip of metal of suitable dimensions or it may be formed by a drawing operation whereby it will be produced in a unitary form without seams. The structure here illustrated and about to be described is designed by cutting and folding a body of metal of suitable dimensions and it comprises spaced parallel side walls 35 connected by the upwardly converging top wall portions 36 which are disposed at an angle relative to one another and to the vertical side walls to conform to four faces of the hexagonal head over which the hood is located. The back edges of the side walls 35 and top wall portions 36 are bordered by inturned flanges 37 and 38 respectively and the distance between the opposing edges of the flanges 37 is approximately equal to the diameter of the bottom of the circular slot 33 so that the flanges 37 are adapted to be slipped down into the slot 33 to place the hood into covering position over the portion of the hexagonal head between the slot and the inner face 26 of the head, as shown in Fig. 2.

The side walls 35 and wall portions 36 are also bordered at their forward edges by inturned flanges 39 and 40 respectively, the opposing edges of the flanges 39 being approximately parallel as illustrated in Fig. 4. These flanges adjacent to their bottom edges have the oppositely positioned notches 41 therein for the purpose hereinafter set forth.

In order to strengthen the hood structure when it is fashioned by bending a strip or sheet of metal to the form illustrated, the corners between the side walls 35 and the top wall portions 36 and the corner formed where the top wall portions join, are pressed inwardly, forming strengthening ribs 42.

The side walls 35 are also in-pressed at suitable locations to form holding dimples 43 on the inner surfaces which, in the application of the hood to the hexagonal head, pass along opposite sides of the hexagonal head and engage under corners thereof as illustrated in Fig. 3 to hold the hood in position on the head.

In addition to the notches formed at 41 in the flanges 39 there are formed in the side walls 35 of the hood above these notches and adjacent to the flanges 39 the oppositely located apertures 44, the function of which will be hereinafter described.

As will be seen from reference to Fig. 2, the width of the hood from the front or forward flanges 39 to the back or rearward flanges 38 is considerably greater than the dimensions of the hexagonal head between the slot 33 and the inner face 26 thereof. In the structure as illustrated it will be seen that the dimension of the head from the slot to the front face is approximately half of this width although, of course, the invention is not limited to these specific relative dimensions so long as there will be provided when the hood is in position on the hexagonal head, a space between the front flanges 39 and the face 26 of the head sufficient to receive the elements about to be described by means of which elements the movement of the valve element 31 relative to the seat and the locking of the valve element onto its seat, when desired, may be effected.

The numeral 45 generally designates the valve element control means or actuator which is attached in the manner about to be described to a float rod and float. This actuator preferably is formed from an elongate plate of metal or other suitable material which is bent transversely intermediate its ends to form the valve element contacting plate 46 and the right angularly extending rocker arm 47 which is pivotally mounted between the flanges 39 in the following manner. The rocker arm 47 has side edge notches 48 formed therein which interengage with the notches 41 when the arm 47 is inserted between the flanges 39. This interengagement is effected by springing the sides of the hood apart slightly to permit the arm to be placed horizontally between the flanges and to effect the interengagement of the notches 41 and 48 in the manner shown in Fig. 4. It will be understood that the interengaged notches are sufficiently large so that there will be the necessary looseness to permit the actuator to rock between the flanges 39. As shown in Fig. 2, when the actuator is placed in position between the flanges, the valve element engaging plate 46 will be disposed upwardly in the space, designated 49, between the forward or front face 26 of the hexagonal head and the flanges 39 and across the valve element and in contact therewith, as shown.

In addition to the notches 48, the rocker arm, which is relatively wide or in the form of a plate of the same width as the plate 46, has therethrough and on the longitudinal center thereof the spaced openings 50 and 51. The opening 51 is in the form of an elongated slot which extends longitudinally of the arm and is designed to pass the hooked end portion 52 of a rod 53, the opposite end of which rod is screw threaded as indicated at 54 for attachment to a float ball 55. The float ball here shown has been illustrated as of the type having a threaded nipple 56 in which the threaded end of the rod 53 may be engaged. However, it is to be understood that any suitable type of float may be used and any suitable means employed for attaching the float to the rod 53 and that, therefore, the structure here shown and described is not to be considered in any way limiting of the invention.

In order to secure the rod 53 to the rocker arm 47, after the hooked or angled end portion 52 has been passed through the slot opening 51 and engaged in the aperture 50, the portion of the rocker arm lying between the slot opening 51 and the free or outer end thereof is bent back under the arm as shown and indicated at 57 and the side portions of this turned-back part are then mashed in against the under face of the arm as shown in Fig. 1 to thereby partially envelope or enclose the rod. The rod will thus be seated in a channeled portion 57ª extending between the said side portions and will be rigidly secured and forms an extension of the rocker arm, as will be obvious.

Adapted for cooperation with the actuator 45 is a rockable locking element which is generally designated 58. This rocking element as shown in Fig. 6 may be formed from a single piece of metal of suitable weight and length and is shaped to provide a wide foot portion 59 from the central part of one edge of which extends a narrow arm 60 which is at right angles to the flat foot portion 59. This arm, at its other or outer end, joins a flat lever tongue 61 which is substantially perpendicular to the arm and approximately parallel with the flat foot portion 59 and extends in the opposite direction from the foot portion with respect to the arm 60.

The width of the foot portion 59 is slightly less than the distance between the inner faces of the hood side walls 35 between which it is designed to be located for use, and the side edges of the foot portion 59 have extending therefrom adjacent to the longitudinal edge with which the arm 60 is joined, the trunnions 62 which are located for turning movement in the apertures 44 of the hood side walls. The width of the arm 60 is less than the distance between the opposing edges of the flanges 39 between which the arm extends, and the width of the lever tongue 61 which is supported on the arm on the outer side of the flanges 39 is slightly greater than the distance between the opposing edges of the flanges 39, as shown in Fig. 4. When the locking element is mounted in position the foot 59 will be disposed as shown in Fig. 2, between the flanges 39 and the side of the actuator plate 46 which is remote from the valve element 31, and the height of the foot 59 is dimensioned so that when the locking element is rocked to swing the lever tongue 61 outwardly and downwardly from the inner side of the hood, the pressure edge 59' will move into engagement with the adjacent face of the actuator plate 46 and may assume a substantially horizontal position as shown in dotted lines in Fig. 2 between this plate and the flanges 39 so as to force the actuator to turn in a direction to move the valve element 31 in closing position on the seat 29 and in assuming this horizontal position the foot will be locked and the valve element will also be locked in valve closed or shut-off position.

It will also be apparent from the foregoing description that when the actuator is turned by the locking element to the locked position or when the float 55 has risen to approximately its maximum height, the actuator plate 46 will be more or less vertical, assuming, of course, that the valve structure as a whole when mounted will have its axis substantially horizontal with the discharge opening 30 directed downwardly.

When the valve element 31 is composed of a relatively compressible material such as rubber or plastic, the parts may be dimensioned so that when the locking element is effective there will be a slight compression of the valve element which will not only be effective for tightly closing the passage 25 but will also be effective to prevent the accidental movement or slipping of the locking element from its locked position.

It will also be seen from the foregoing description that this valve structure is of a unique design which permits the body 14 to be initially placed in working position with the hood and parts carried thereby detached from the body. After the body 14 has been located exactly as required, then the hood and parts carried thereby may be easily slipped onto the body 14 by sliding the flanges 38 into the circumferential channel or groove 33 in an obvious manner. As previously stated, in this action of slipping the hood into position, the retaining dimples 43 which extend inwardly from the side walls 35 of the hood, will be forced down across opposite flat sides of the hexagonal head, there being sufficient resiliency in the hood structure to permit the slight expansion or separation of the side walls 35 for this purpose and after the hood is properly seated, the dimples, because of the proper positioning of the same, will slide off of the side faces of the hexagonal hood and the outsprung walls 35 and spring back so that the dimples will be hooked or engaged under the adjacent rounded corners, designated 15' in Fig. 3, and thus fix the hood in position.

When the locking element is in the unlocked position provision is made for maintaining it upright, as shown in broken lines in Fig. 2, by means of a dimple pressed inwardly in a side wall 35 of the hood. When the locking element is pressed inwardly by the tongue 61 a side edge of the foot portion 59 will ride over the dimple 43a and be secured between the latter and the adjacent flange 39.

We claim:

1. A float controlled valve structure comprising an elongate body having a passageway extending axially therethrough from one end thereof and having a chamber in the other end of the body with the passageway intersecting said chamber, means for coupling a pipe to said one end of the body, said chamber opening axially through the said other end of the body and further having a laterally directed fluid discharge port, a valve element movably confined in the chamber and having a seated position in which it closes the passageway, a valve element actuator pivotally supported by the body and comprising a rocker arm and an angular extension of the arm, said angular extension being engageable with the valve element and acting upon swinging of the actuator in one direction to move the valve element to said seated position, float means connected with the rocker arm, and locking means supported by the body for movement into engagement with said angular extension to lock the actuator against movement when the valve element is in seated position, said body having opposite side portions having transversely extending slots, the slots being adjacent to said other end of the body, a hood having open ends and encasing a portion of said other end of the body and having spaced side walls and a top wall connecting the side walls, the side and top walls at one end of the hood having inwardly projecting flanges engaging in said slots, said side walls extending at the other end of the hood longitudinally of the body and beyond said other end of the body and having inwardly projecting flanges at said other end of the hood, said angular extension of the valve element actuator being in the form of a plate positioned within the hood, said rocker arm having side edges pivotally coupled with said hood, and said locking means comprising a wide pressure foot disposed across the side of said plate opposite from the valve element and extending between and pivotally attached at opposite sides to the hood side walls, an arm joined to said pressure foot and extending outwardly between the second mentioned inwardly projecting flanges, and a lever carried by the arm on the outer side of the said second mentioned flanges for facilitating rocking of the foot into engagement with the adjacent face of the plate of the actuator.

2. A flush tank valve assembly comprising a threaded body adapted for connection to a water inlet line and an actuator mechanism removably mounted on one end of said body, said body having a passageway therethrough, a valve ball carried by the body for limited free movement relative to and for opening and closing said passageway, means on said actuator mechanism to actuate said valve ball, said actuator mechanism including a portion movable toward and away from said end of the body and having a float ball attached thereto for effecting such movement in response to the rise and fall of water in an associated flush tank, said actuator mechanism including a hood removably secured on and maintained against movement relative to the body in the actuation of the valve and by means of which said mechanism is removably mounted on the body, said hood being of generally U-shaped configuration with an open bottom and having a wall thereof with an opening therein to receive said end of the body therein and having opposite side walls straddling and frictionally-resiliently gripping said body whereby the hood may be slipped onto and off of said body.

3. A flush tank valve assembly comprising an elongate body threaded at one end for connection to a water inlet line and having an enlarged hexagonal head portion at the other end, said body having an axial passageway therethrough, which passageway is enlarged within the confines of the enlarged head portion to form a chamber, there being a resilient ball member confined for limited free movement within said chamber to open and close said passageway, said enlarged head portion having an annular groove therein, a generally U-shaped hood having opposite side walls interconnected by a top wall and having inturned flanges along one vertical edge of said side walls frictionally removably received within said groove with the hood straddling said enlarged head portion of the body and with the opposite side walls of the hood embracing flat vertical sides of said hexagonal enlarged head portion, the side walls of said hood being sufficiently wide to extend beyond said other end of the body, an actuator pivotally mounted on said hood beyond said body and having a plate portion movable toward and away from the body to move said resilient ball into passageway closing position and to permit the ball to be forced by water pressure away therefrom.

4. A float controlled valve comprising an elongate body having a threaded portion at one end thereof and having an enlarged hexagonal head at the other end thereof, said body being recessed in the threaded end thereof and having an enlarged chamber in the head end thereof, which chamber opens upon the corresponding end face of the body and there being a reduced passageway communicating the recess and chamber and forming a valve seat at the point of intersection with the chamber, a resilient ball confined for limited free movement received within said chamber and being of a diameter to permit shifting of the ball within the chamber toward and away from said valve seat and to protrude somewhat beyond said end face of the body, a hood removably positioned on said head end of the body and extending therebeyond, and an actuator assembly pivotally attached to said hood beyond said end face of the body and including a generally vertical plate portion engageable with the protruding portion of said resilient ball to force the ball into engagement with the valve seat and permit the ball to move out of engagement therewith.

5. A float controlled valve comprising an elongate body having a threaded portion at one end thereof and having an enlarged hexagonal head at the other end thereof, said body being recessed in the threaded end thereof and having an enlarged chamber in the head end thereof, which chamber opens upon the corresponding end face of the body and there being a reduced passageway communicating the recess and chamber and forming a valve seat at the point of intersection with the chamber, a resilient ball received within said chamber and being of a diameter to permit shifting of the ball within the chamber toward and away from said valve seat and to protrude somewhat beyond said end face of the body, a hood removably positioned on said head end of the body and extending therebeyond, and an actuator assembly pivotally attached to said hood beyond said end face of the body and including a generally vertical plate portion engageable with the protruding portion of said resilient ball to force the ball into engagement with the valve seat and permit the ball to move out of engagement therewith, a lock device for moving said plate portion of the actuator into engagement with said ball to close said valve seat and for maintaining the same in such position, said lock assembly including a metallic tab pivotally mounted on said hood and movable into and out of position for engaging said plate portion of the actuator to force it in valve closing direction.

6. The assembly as defined in and by claim 4 wherein said actuator comprises a metallic strip of generally L-shaped configuration including said vertical plate portion and a generally horizontally extending portion, the horizontally extending portion terminating in a curved flange and there being a rod passing through the flange and having an upturned end portion projecting through the horizontal portion adjacent the juncture thereof with the vertical plate portion, said rod having a float ball attached to its free end.

7. A float controlled valve comprising an elongate body having a threaded portion at one end thereof and having an enlarged hexagonal head at the other end thereof, said body being recessed in the threaded end thereof and having an enlarged chamber in the head end thereof, which chamber opens upon the corresponding end face of the body and there being a reduced passageway communicating the recess and chamber and forming a valve seat at the point of intersection with the chamber, a resilient ball received within said chamber and being of a diameter to permit shifting of the ball within the chamber toward and away from said valve seat and to protrude somewhat beyond said end face of the body, a hood removably positioned on said head end of the body and extending therebeyond, and an actuator assembly pivotally attached to said hood beyond said end face of the body and including a generally vertical plate portion engageable with the protruding portion of said resilient ball to force the ball into engagement with the valve seat and permit the ball to move out of engagement therewith, said actuator comprising a metallic strip of generally L-shaped configuration including said vertical plate portion and a generally horizontally extending portion, the horizontally extending portion terminating in a curved flange and there being a rod passing through the flange and having an upturned end portion projecting through the horizontal portion adjacent the juncture thereof wtih the vertical plate portion, said rod having a float ball attached to its free end, and a lock for maintaining said plate portion in engagement with said ball to close said valve seat, said lock being of generally Z-shaped configuration and being pivoted intermediate its ends to said hood with a portion projecting beyond such pivotal connection toward said plate portion of the actuator whereby pivotal motion of the lock will force the plate portion into engagement with the resilient ball to close the valve seat.

References Cited in the file of this patent

UNITED STATES PATENTS

| | | |
|---|---|---|
| 1,679,949 | Slagel | Aug. 7, 1928 |
| 1,980,144 | Siena et al. | Nov. 6, 1934 |
| 2,512,176 | Shaffer | June 20, 1950 |
| 2,766,770 | Dickinson | Oct. 16, 1956 |
| 2,827,916 | Manchester | Mar. 25, 1958 |